Dec. 3, 1940.                    E. L. RULISON                    2,223,832
       PROCESS FOR THE RECOVERY OF PRECIOUS METALS PRESENT IN SEA WATER
                 Filed Nov. 17, 1937           5 Sheets-Sheet 1

INVENTOR.
Earl L. Rulison
BY
ATTORNEYS.

Dec. 3, 1940. E. L. RULISON 2,223,832
PROCESS FOR THE RECOVERY OF PRECIOUS METALS PRESENT IN SEA WATER
Filed Nov. 17, 1937 5 Sheets-Sheet 5
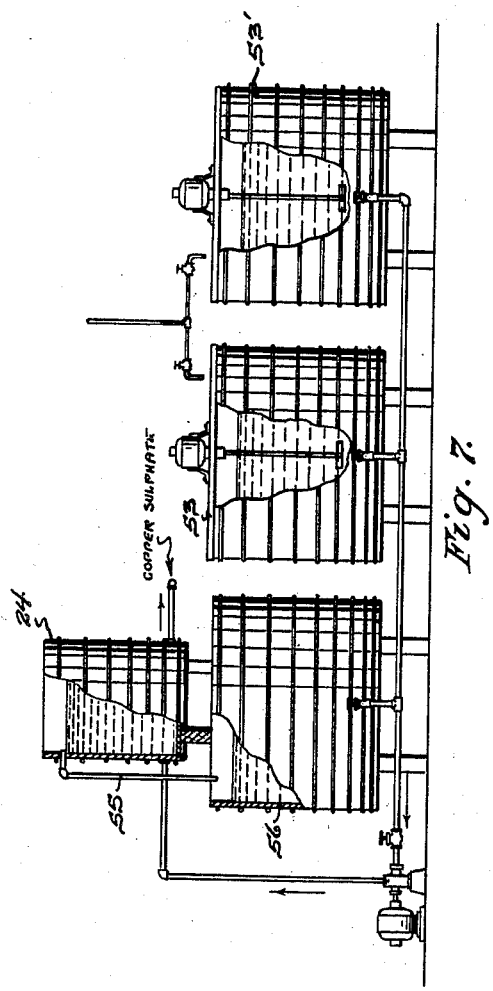
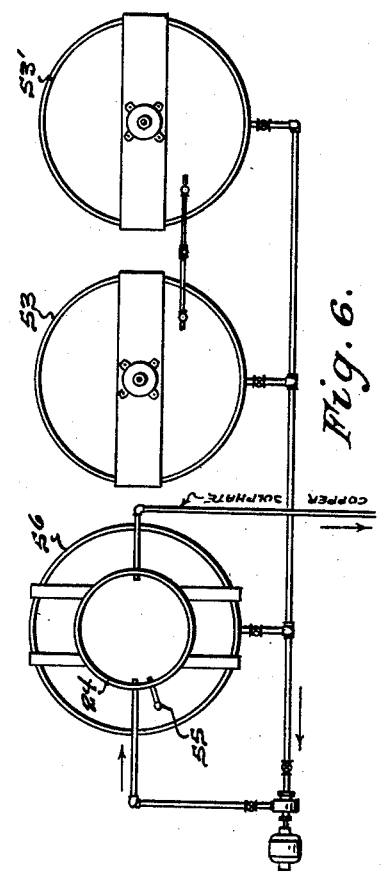
INVENTOR.
Earl L. Rulison
BY
ATTORNEYS.

Patented Dec. 3, 1940

2,223,832

UNITED STATES PATENT OFFICE 2,223,832

PROCESS FOR THE RECOVERY OF PRECIOUS METALS PRESENT IN SEA WATER

Earl L. Rulison, Seattle, Wash., assignor to Zee Development Corporation, Seattle, Wash., a corporation of Washington Application November 17, 1937, Serial No. 175,071

21 Claims. (Cl. 75—109)

This invention relates to the treatment of sea water for extracting precious metals therefrom. Its object is, stated generally, to provide a process together with equipment therefor by which electro-chemically decomposed precious metals present in sea water may be precipitated and converted from the ionic to the metallic state, the metallic precipitate in turn treated to obtain coagulation, and these coagulated values collected in a form permitting recovery through suitable well-known processes.

It is a further object of my invention to provide steps by which added values transitorily recovered but which normally would be lost in the tailing water due to high velocity of working are trapped in their passage through the system.

Having in view these and other still more particular objects, the nature of which will appear in the course of the following detailed description and claims, the invention consists in the novel process and in the association of tanks and related equipment for working the process, as hereinafter described and claimed.

In the drawings:

Figures 1 and 2 collectively represent a top plan view of equipment suitable for practicing the present process.

Fig. 5 is a somewhat schematic detail view showing one of the amalgamation tanks and the system of circulating and retorting the mercury which is used therein; and Figs. 6 and 7 are top plan and side elevational views, respectively, indicating equipment which I use to supply a concentrated solution of copper sulphate into the stream of sea water for coagulation purposes.

Figure 1:
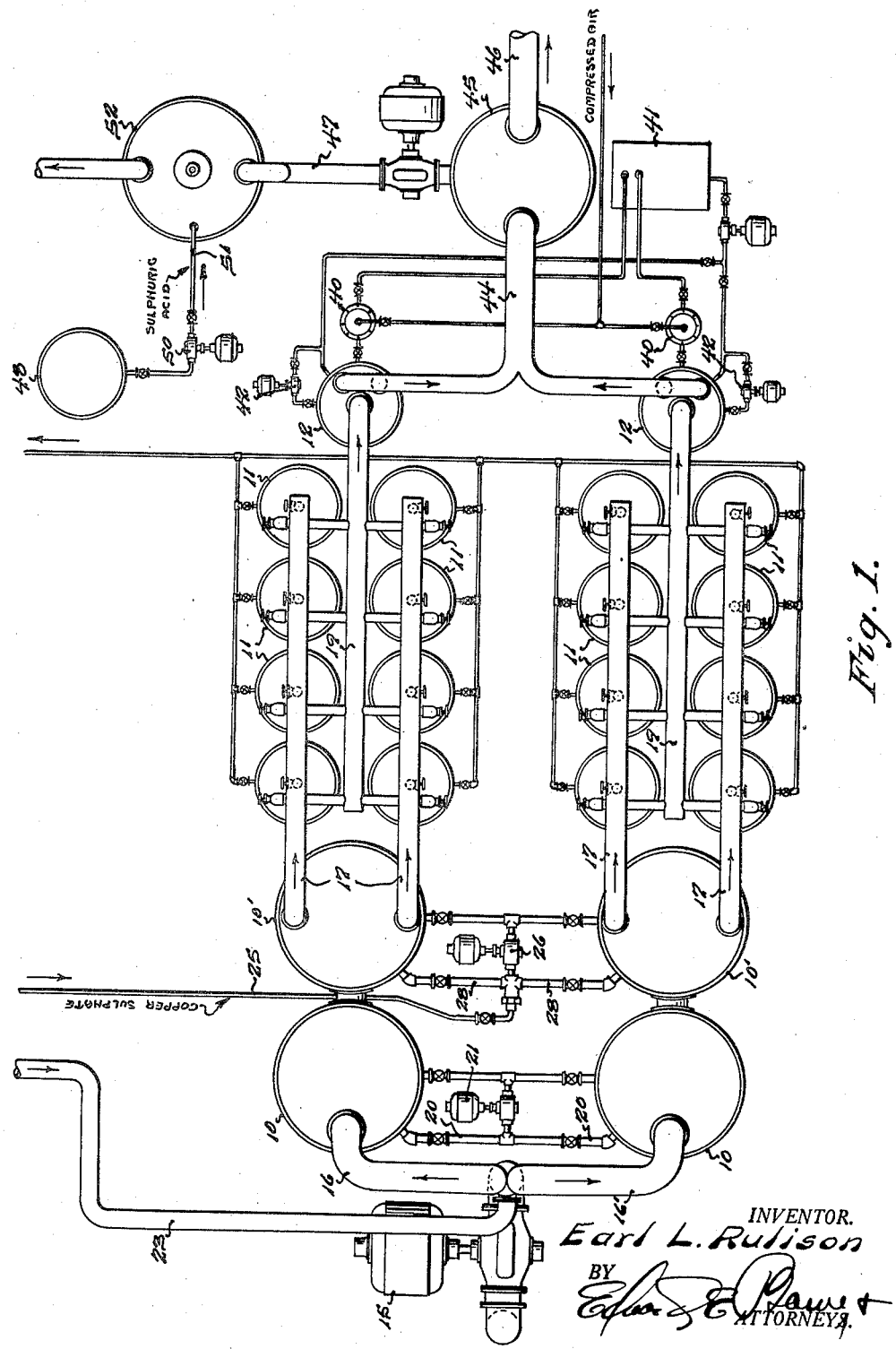
Figure 2:
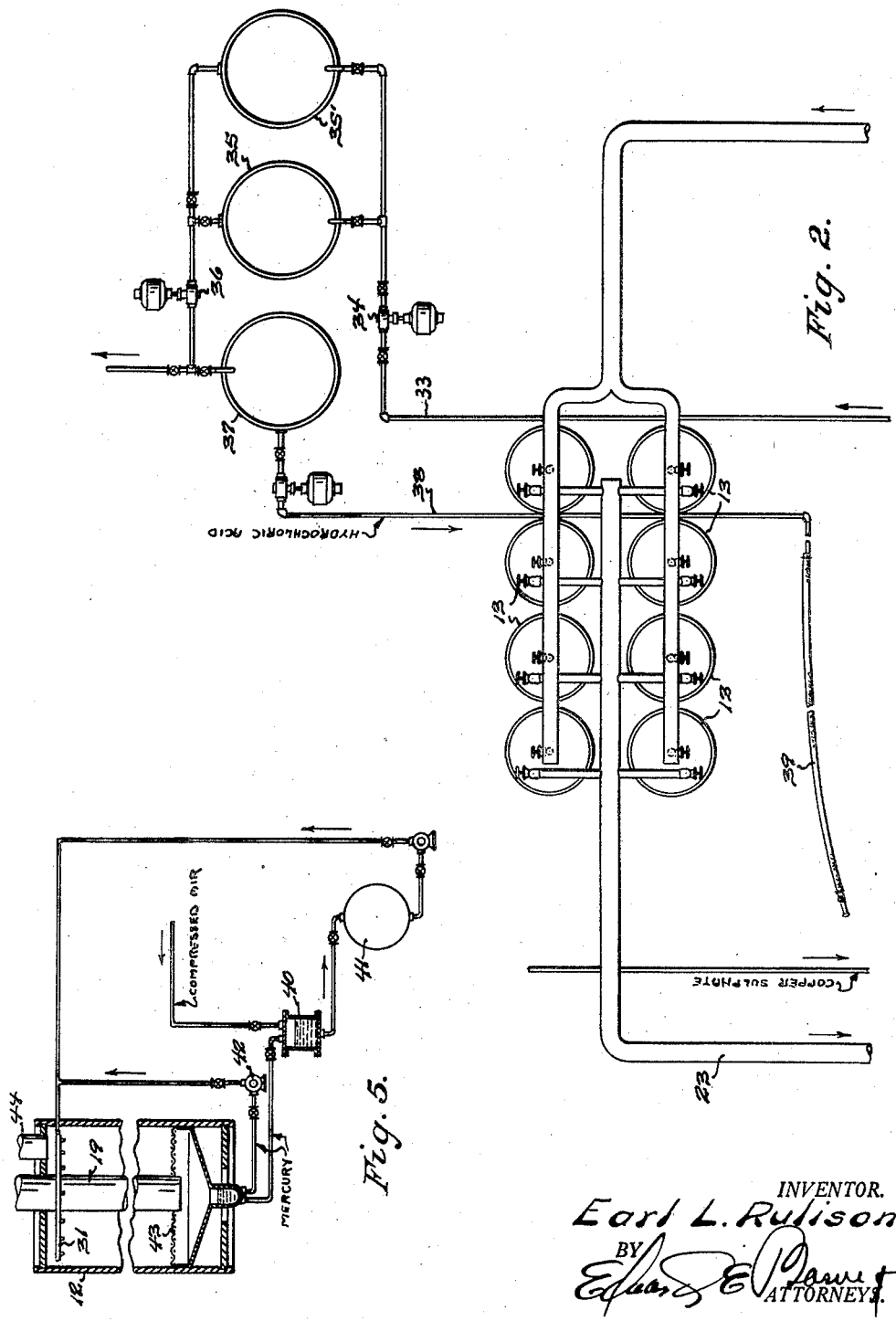
Figure 3:
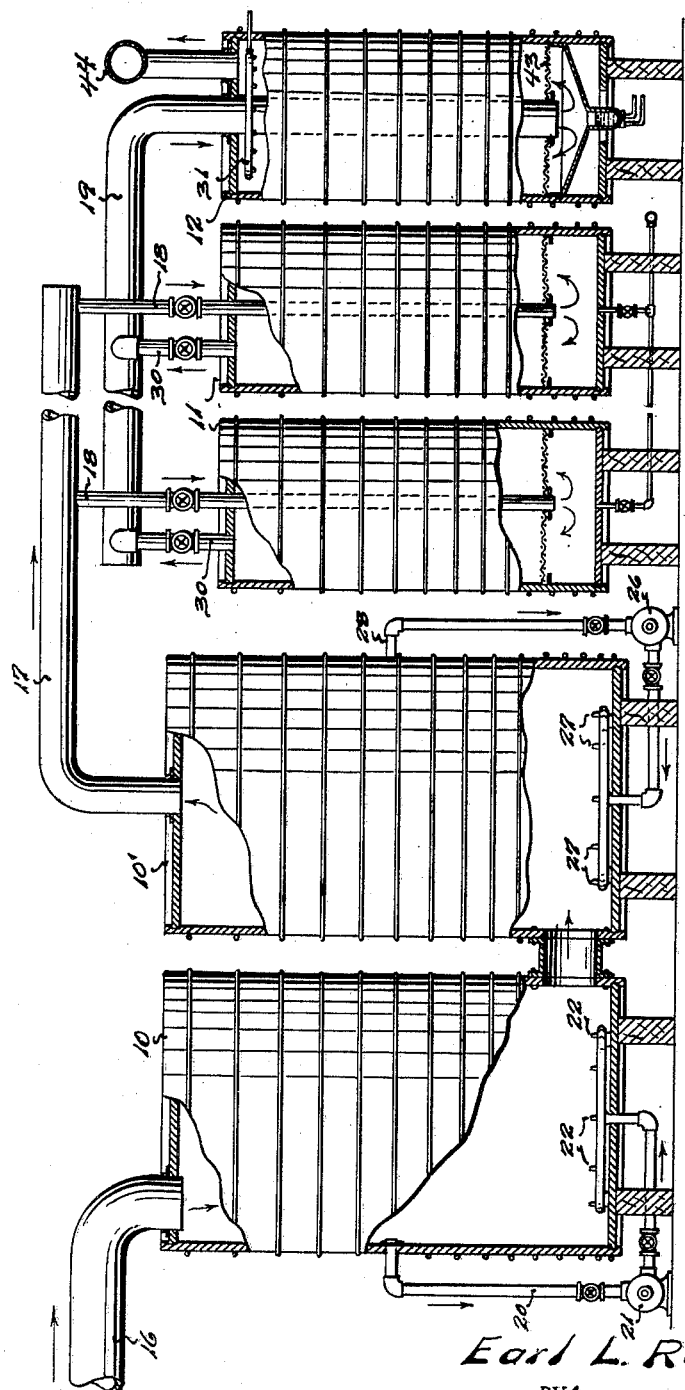
Fig. 3 is taken to an enlarged scale and is a side elevation, with parts broken away and shown in vertical section, illustrating a series of the agitation, co-lation, and amalgamation tanks through which the sea water is successively carried in the treatment thereof for extraction of the precious metals.
Figure 4:
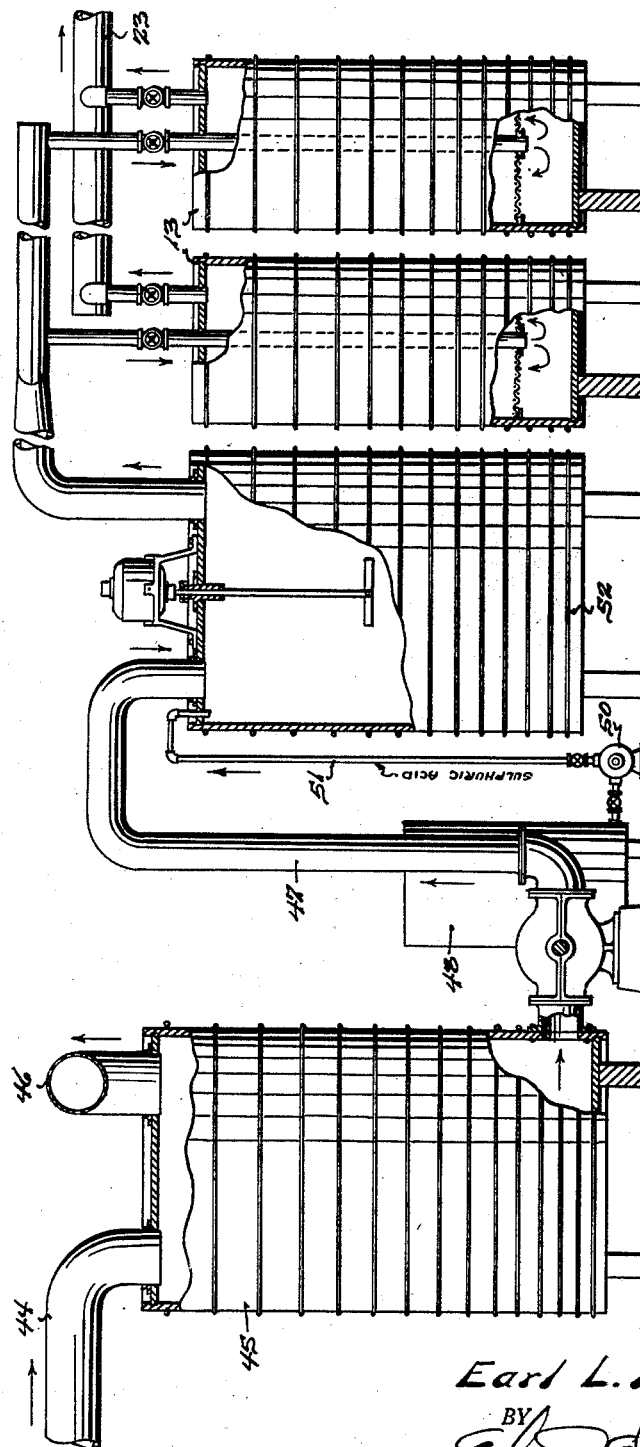
Fig. 4 is a side elevational view, parts being broken away and shown in vertical section, illustrating a series of the tanks employed to treat a portion of the tailing water for regenerating ferrous sulphate which is introduced to the head of the system.

It is to be understood in a consideration of the values present in sea water that these values in the main occur in the ionic condition as chlorides, bromides and iodides, with possibly other more complicated gold, silver and platinum salts. I employ, in working such water, a plant comprised of a multiplicity of tanks which, for clarity in description, can be referred to as (1) two groups of primary and secondary agitation tanks 10—10', (2) a series of co-lation tanks 11 for each pair of agitation tanks, (3) amalgamation tanks 12, one for each series of co-lation tanks, and (4) regeneration tanks 13, the water being forced through these tanks successively under the pressure influence of a suitable pump 15 capable, preferably, of passing 5000 or more gallons per minute. The system is preferably branched, which is to say that one series of tanks may be isolated from the other for cleaning purposes and it will suffice, in the following description, to describe one branch only of the plant. It will be readily seen in the drawings that the incoming sea water is forced from the pump through either of the branch leads 16—16' into the head of the primary agitation tank 10, being delivered from the bottom thereof into the bottom of the secondary agitation tank 10', and is passed from the head of this secondary tank into a manifold 17 which leads by pipes 18 into the lower ends of the co-lation tanks, being withdrawn from the upper end of the co-lation tanks and fed through a manifold 19 into the lower end of the amalgamation tank 12.

I provide, for agitating the water in the tank 10, a by-pass 20 leading laterally from the tank, drawing the water into this by-pass by a pump 21 and ejecting the same through pressure nozzles 22 which lie at the bottom of the tank to force the water in accelerated jets upwardly through the descending water stream.

According to the process, ferrous sulphate and sulphuric acid are introduced to the sea water in advance of its introduction to the primary agitation tank, such sulphate and acid being fed through a pipe 23 which leads from the regeneration tanks 13, the acid being in sufficient quantity to obtain a hydrogen ion concentration of between pH 5.0 and pH 6.2 which, for normal sea water, is found to be in the proportion of approximately 50 cc. of acid per ton of water. The reaction with the sodium chloride present in the water is to form hydrochloric acid and thereby place the solution in condition for precipitation which accomplishes a reduction of the gold, silver and platinum to a colloidal state by the chlorine-induced oxidization of the sulphate to its ferric condition. Colloids of gold, silver and platinum, as is well known, carry negative electric charges which prevent a coagulation from the fact of the particles being repelled and it is this negative charge which has enabled me to work out a rapid process of coagulation by the introduction, to the circuit, of copper sulphate. This sulphate is introduced from a supply tank 24 therefor through a pipe 25 into the sea water co-incident with the traversal by the latter of a by-pass line 28 in which is a pump 26, said pump, by-pass, and a complementing nozzle 27 which is disposed within the secondary tank acting to turbulate the water within said secondary tank in the same manner as the corresponding parts 21, 20 and 22 in the primary tank 10. While the nozzle in tank 10' is illustrated as projecting an accelerated stream in a like direction to the direction of the principal flow, an opposing flow similar to that obtained in the primary agitation tank might obviously be used. Turbulation as between the copper sulphate and the acidified sea water obtains an adsorption of the ions of copper sulphate on the surface of the colloidal particles, differences in polarity prevailing. Precious metals lie below copper in the electromotive series and are therefore incapable of reducing the copper ions to their metallic state although it is highly probable that the copper is reduced from the cupric to the cuprous or high-proportional condition.

The solution thus prepared and containing the colloidal gold, silver and platinum particles with absorbed copper ions is passed through the tanks 11, these tanks being referred to as co-lation tanks from the fact that the action therein is one of chemical screening. The tanks, more particularly, are filled with scrap zinc metal and formed therein by the interaction of the initially produced hydrochloric acid and zinc is zinc chloride. Copper, deposited as a replacement for the zinc, firmly holds the gold, silver and platinum particles through opposite polarities of the reacting substances, these colloidal values forming a portion of the coating on the zinc. In working the process I isolate the co-lation tanks periodically— a valve therefor being provided on each of the leads 18 and 30 which connect the tanks with the admission and discharge manifolds 17 and 19—and wash the zinc in the isolated co-lation tank with dilute hydrochloric acid to dissolve a portion of the zinc underlying the coating, this freed coating, which is scummy in nature being drawn under the influence of a pump 34 through pipes 33 which lead from the base of the co-lation tanks and forced into alternately used filter tanks 35—35' wherein the values are withdrawn by filtering. A pump 36 ejects the filtrate and a portion thereof is fed into a supply tank 37 wherein the acid content is replenished for re-use in cleaning the co-lation tanks. 38 denotes a pipe leading from the supply tank 37 and 39 indicates a hose on the pipe permitting the hydrochloric acid to be played over the interior of the isolated co-lation tank. Manholes, not shown, are provided in the top of each co-lation tank 11, to accommodate the introduction of the acid-spraying hose. The freed coating collects in the tanks 35—35' as a metallic residuce of gold, silver and platinum with copper, this residue being melted into bars and the precious metals recovered by known treatment such, for example, as the electrolytic process for refinement of copper.

In working the process it is found that a small proportion of float material is left in the tailing water issuing from the co-lation tanks which can be profitably recovered by amalgamation. The tank 12 for recovering this float material is filled with scrap copper amalgamated with mercury and into the upper end of such tank, through a nozzle 31, a continuous stream of mercury is supplied, the mercury, running over the scrap copper, washing the metallic particles of copper, gold, silver and platinum to the bottom of the tank. From the collecting sump at the bottom of the tank 12 the mercury is withdrawn into a collecting basin 40 from where it is forced under the influence of compressed air into a retort 41, the vaporized mercury being condensed and the sublimate re-introduced through the nozzle to the amalgamation tank, the residue metals within the retort being removed at intervals. The liquid mercury is continuously circulated by a pump 42 which is fed from the sump. It will be seen that the gravity flow of the mercury within the tank 12 causes the same to course downwardly to obtain a directional flow converse to that of the water stream which passes upwardly through a screen 43 following its issue from the discharge end of the manifold 19. Similar screens are provided in the co-lation tanks.

As the tailing waters issue from the amalgamation tank through the lead 44 I deliver the same to a tailing tank 45 from which the greater portion is carried through an extended flume 46 and released in distal relation to the point at which fresh sea water is drawn into the head of the system, the remaining portion being diverted through a pipe 47 and regenerated by the steps of acidifying with sulphuric acid and passing the same through the regeneration tanks 13 into which scrap iron is introduced, the regenerated ferrous sulphate being carried to the head of the system through the pipe 23. 48 indicates a receptacle from which the sulphuric acid is drawn by a pump 50 for introduction through pipe 51 into a tank 52 wherein the same is agitated with the diverted water stream in advance of the delivery into the first of the regeneration tanks 13. It is of course to be understood that commercially available crystalline ferrous sulphate may be employed where the cost thereof is sufficiently low to be attractive.

In Figs. 6 and 7 is represented equipment employed to supply the concentrated solution of copper sulphate to the water stream, consisting in a pair of mechanically agitated water tanks 53—53' into which copper sulphate crystals are introduced, the solution being withdrawn from these tanks alternately and pumped into supply tank 24. An overflow line 55 leading to a catch-basin 56 assures a constant supply of the concentrated solution of copper sulphate, in that a continuous feed of the solution is carried into the supply tank.

I find that all chemical reactions can be completed and the waters caused to traverse the circuit within a period approximating two minutes, thereby rendering the system capable of handling extremely large quantities of water and consequently providing very profitable working from the relatively unlimited field available. This rapid action is particularly important in the practical development of a system of recovering values from sea water from the fact that the values are minute considered in relation to the volume of water handled. Complementing this exceptionally large volumetric capacity in the provision of a plant capable of being worked at an attractive profit is the inexpensive nature of the equipment used.

What I claim is:

1. The process of recovering precious metals present in sea water which consists in introducing sulphuric acid and ferrous sulphate to the body of water to be treated and by the physical act of agitation producing hydrochloric acid and accomplishing a reduction of the values to negative-ion particles by the chlorine-induced oxidization of the sulphate to a ferric condition, introducing positive-ion copper sulphate to the solution and by the physical act of agitation intimately commingling the sulphate with the colloidal particles of opposite polarity, successively passing the solution at a high velocity upwardly through a body of scrap zinc metal and a body of copper scrap amalgamated with mercury, and continuously forcing a down-flow stream of mercury over the scrap copper, the mercury being retorted following its travel over the copper, condensed and returned.

2. The process as defined in claim 1 wherein the ferrous sulphate is generated by adding sulphuric acid to water and passing the same, in advance of its introduction to the water to be treated, upwardly through tanks filled with scrap iron.

3. The process of recovering precious metals present in sea water which consists in introducing sulphuric acid and ferrous sulphate to the body of water to be treated and by the physical act of agitation producing hydrochloric acid and accomplishing a reduction of the values to negative-ion colloidal particles by the chlorine-induced oxidization of the sulphate to a ferric condition, introducing positive-ion copper sulphate to the solution and by the physical act of agitation intimately commingling the sulphate with the colloidal particles of opposite polarity, and forcing the solution at a relatively high velocity through a co-lation tank filled with scrap zinc metal.

4. The process of recovering precious metals present in sea water which consists in introducing sulphuric acid and ferrous sulphate to the body of water to be treated, agitating the solution, introducing copper sulphate thereto and again agitating the solution, forcing the same at a relatively high velocity through a co-lation tank filled with scrap zinc metal, and, to recover float particles of copper and the precious metals left in the tailing water due to the high velocity of flow through the zinc-filled co-lation tank, passing the solution from the co-lation tank through scrap copper amalgamated with mercury.

5. The process of recovering precious metals present in sea water which consists in introducing sulphuric acid and ferrous sulphate to the body of water to be treated and thereby obtaining a reduction of the values to negatively charged colloidal particles, introducing positive-ion copper sulphate to the solution and agitating to intimately commingle the sulphate with the colloidal particles of opposite polarity, and, with the attracted values of opposite polarity carried thereby, depositing the copper ions as a coating by passing the solution through a co-lating body of scrap zinc metal.

6. The process of recovering precious metals present in sea water which consists in introducing sulphuric acid and ferrous sulphate to the body of water to be treated and by the physical act of agitation reducing the values to negatively charged colloidal particles, introducing positive-ion copper sulphate to the solution and by the physical act of agitation obtaining an adsorption of the copper sulphate ions on the colloidal particles, effecting a deposit of the values by passing the solution through a co-lating body of zinc metal scrap to trap the copper ions adsorbed on the colloidal particles, and periodically removing the values by washing the zinc scrap with a solution of hydrochloric acid.

7. The process of recovering precious metals from sea water consisting in introducing sulphuric acid and ferrous sulphate to the body of water to be treated and forcing the same through an agitation tank to produce hydrochloric acid and accomplish a reduction of the values to a colloidal state by the chlorine-induced oxidization of the sulphate to a ferric condition, introducing copper sulphate to the water issuing from the agitation tank and forcing the same through a second agitation tank to intimately commingle the copper sulphate with the colloidal particles and obtain adsorption of the positive-ion sulphate on the negative-ion colloids, forcing the solution from the second agitation tank upwardly through a tank filled with a co-lating body of scrap zinc metal to produce zinc chloride by the action of the initially produced hydrochloric acid and obtain a deposit of the zinc-replacing copper with the negative-ion colloidal particles carried thereby, trapping float material carried with the tailing water from the co-lation tank by forcing the water upwardly through a tank filled with scrap copper through which a down-flow current of mercury is continuously passed, and regenerating ferrous sulphate for re-introduction to the head of the system by treating a portion of the tailing water discharged from the amalgamation tank with sulphuric acid and passing the water so treated through bodies of scrap iron.

8. The process defined in claim 7 wherein the coating deposited in the co-lating tank is removed at intervals by isolating the tank and washing the scrap zinc with a solution of hydrochloric acid and wherein the particles of copper and values trapped by the mercury wash are removed by the steps of draining the mercury from the bottom of the amalgamation tank and retorting the same, the mercury vapors being condensed and returned for cyclical use to the upper end of the amalgamation tank.

9. The process of recovering precious metals present in sea water which consists in adding sulphuric acid and ferrous sulphate to the body of water to be treated, introducing copper sulphate to the water and passing the same through zinc metal, periodically removing the values collected as a coating on the zinc by washing the zinc with a solution of hydrochloric acid, and filtering the freed coating.

10. The process defined in claim 9 wherein the acid content of the filtrate is replenished and returned for re-use in washing the zinc.

11. The process defined in claim 9 and the step of trapping float material following passage of the water through the zinc metal, said step consisting in passing the water through scrap copper over which liquid mercury is continuously passed, the mercury being retorted to remove the values.

12. The process of preparing sea water for recovery of precious metals present therein which consists in the steps of adding sulphuric acid and ferrous sulphate to a stream of the water to be treated, and by the physical act of agitation producing hydrochloric acid and accomplishing a reduction of the values to negative-ion colloidal particles by the chlorine-induced oxidization of the sulphate to a ferric condition.

13. The process steps described in claim 12 and the added preparation step of introducing positive-ion copper sulphate to the solution and by the physical act of agitation intimately commingling the sulphate with the colloidal particles of opposite polarity.

14. The process of preparing sea water for recovery of precious metals present therein which consists in accomplishing, by acid treatment, a reduction of the values in the water to negative-ion particles, and introducing positive-ion copper sulphate to the solution and by the physical act of agitation intimately commingling the sulphate with the colloidal particles of opposite polarity.

15. The process of recovering precious metals present in sea water which consists in accomplishing, by acid treatment, a reduction of the values to negative-ion particles, introducing positive-ion copper sulphate to the solution and intimately commingling the sulphate with the colloidal particles of opposite polarity, and chemically screening the water to remove the values by the act of passing the water through zinc metal.

16. The process defined in claim 15 and the step of separating the values deposited as a coating on the zinc which consists in washing the zinc with dilute hydrochloric acid and filtering the freed coating.

17. In a process of recovering precious metals present in sea water, the steps of passing the body of water to be treated over zinc metal to obtain a deposit of the greater portion of the values and subsequently trapping float material carried with the water from the zinc by feeding the water through scrap copper over which liquid mercury is continuously being passed, the method of feeding said water and liquid mercury consisting in forcing the water upwardly at a relatively high velocity and passing the mercury downwardly through the copper.

18. An amalgamation circuit for trapping values present in a stream of water which comprises a tank filled with scrap copper amalgamated with mercury, a collecting sump in the base of the tank, means for delivering a pressure stream of the water into the bottom of the tank above the sump and withdrawing the water from the top of the tank whereby the water, in its travel through the tank, passes upwardly over the copper, means for introducing a continuous stream of mercury into the head end of the tank whereby the mercury, by force of gravity, passes downwardly through the rising water into the sump, and means for withdrawing the mercury from the sump for retorting the same.

19. The circuit defined in claim 18 wherein a portion only of the mercury is withdrawn for retorting from the sump and the remainder pumped in a continuous circuit through the tank, means being provided for returning condensed mercury vapors from the retort for cyclical re-use to the upper end of the tank.

20. In a process of recovering precious metals present in sea water, the steps of trapping float material in a stream of the water being treated which consists in passing the water upwardly through an amalgamation tank through which a down-flow current of mercury is continuously passed, draining a portion only of the mercury from the bottom of the tank and retorting the same while maintaining a circulation of the remainder of the mercury through the tank, and condensing the mercury vapors and returning the same to the upper end of the tank to replenish the mercury being circulated therethrough.

21. In a process of recovering precious metals present in sea water, the steps of trapping float material in a stream of the water being treated which consists in passing the water through an amalgamation tank and, coincident therewith, circulating mercury through the same, draining a portion only of the mercury from the bottom of the tank and retorting the same while maintaining a circulation of the remainder of the mercury through the tank, and condensing the mercury vapors and returning the same to the mercury-circulating system to replenish the mercury therein, without interruption in the circulation of the latter.

EARL L. RULISON.